Patented Aug. 3, 1926.

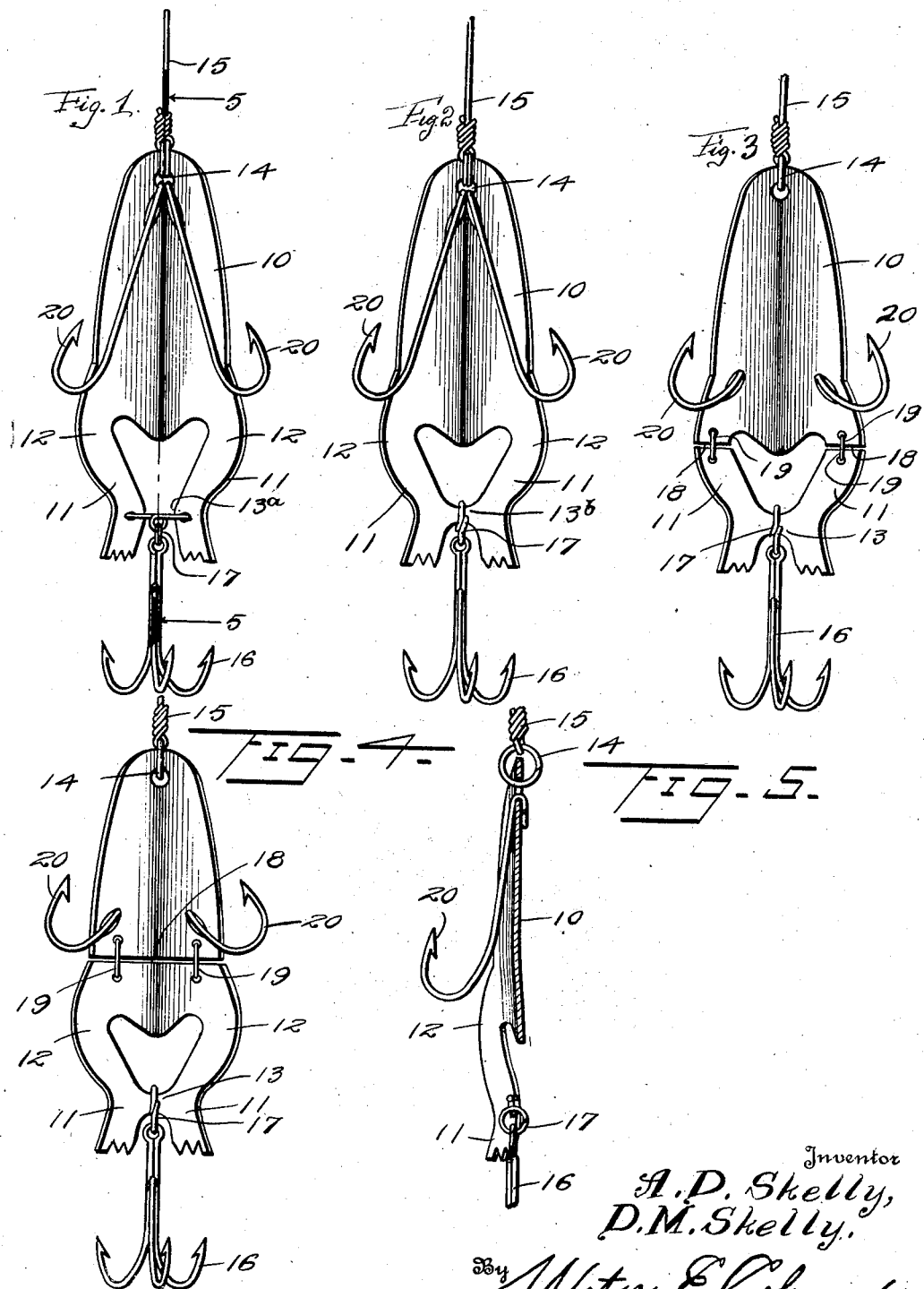

1,594,798

UNITED STATES PATENT OFFICE.

ALLAN D. SKELLY, OF LAWRENCE, AND DAVID M. SKELLY, OF METHUEN, MASSACHUSETTS.

FISHING LURE.

Application filed January 30, 1926. Serial No. 84,968.

REISSUED

This invention relates to fishing lures and more particularly to a device of this character which is adapted to simulate in its action the movement of a frog.

An important object of the invention is to provide a device of this character which will have a longitudinal rocking movement during its travel through the water, resulting from the varying speed of its movement through the water.

A further object of the invention is to provide a device of this character wherein a kicking movement of the leg section of the lure is provided.

A still further object of the invention is to provide novel and improved means for attaching the hooks to the body of the lure and more particularly to the manner of attaching the trailing hooks.

These and other objects we attain by the construction shown in the accompanying drawing, wherein for the purpose of illustration is shown a preferred embodiment of our invention and wherein:—

Figure 1 is a bottom plan view of a lure constructed in accordance with our invention;

Figure 2 is a similar view of a slightly modified form of the invention;

Figures 3 and 4 are similar views of further modifications;

Figure 5 is a longitudinal sectional view through the lure shown in Figure 1.

Referring now more particularly to the drawing, the lure comprises a plate cut to represent a silhouette, a body 10 and legs 11 of a swimming frog. The legs 11 adjacent the body portion are relatively widely spaced, as at 12, and converge rearwardly to a point 13 where they are connected to one another and from which point they again diverge, lending to the leg section a decussate appearance, the bight being represented by the portion 13. The connection between the adjacent points of the legs may be either applied, as at 13ª, in Figure 1, or provided by leaving a connecting bridge 13ᵇ in the formation of the lure.

It will be noted that the body 10 presents a much greater surface resistance than is presented by the legs 11 due to the formation of the opening 12. The forward end of the body is provided with an attaching eye 14 to which the fishing line 15 may be connected and as the lure is drawn through the water, unless the movement with which it is drawn through the water is absolutely uniform, there will be a tendency of the leg end of the body to drop as the speed decreases and again raise as the speed increases, causing a rocking motion of the lure. This tendency is further increased by attaching the trailing hooks or hook gang 16 to the bight portion 13 between the legs 11, a split ring 17 being employed for this purpose.

To further increase the life-like action of the lure, the sheet from which the lure is formed is transversely cut, as at 18, and the sections thus formed linked together, as at 19, so that the entire body may have a wabbling motion of the sections with relation to one another. The transverse splitting of the body may take place within the body proper or at the ends of the legs adjacent the body, as is found desirable. Additional hooks may be applied to the body, as at 20, when the lure is to be employed with side-striking fish, such as bass. If desired, the body may be bent upon its longitudinal axis, as more clearly shown in Figure 5, the convex side being the side opposite that upon which the hooks 20 are disposed. This bending of the body will tend to cause the hooks 20 to remain at the lower surface of the body during movement of the lure through the water with the result that they assume somewhat the appearance of the front legs of the frog.

Since the structure hereinbefore set forth is obviously capable of a certain range of change and modification without materially departing from the spirit of the invention, we do not limit ourselves to such specific structure except as hereinafter claimed.

We claim:—

1. A fish lure comprising a metallic blank increasing in width from its front end to a point adjacent its rear end and having formed in such rear end an opening reducing the effective area of the widened portion of the plate to a point where it is less than the effective resistance of the narrower portions of the plate, hooks supported from the plate and means at the forward end of the plate for attaching a fish line thereto.

2. A fish lure comprising a metallic blank increasing in width from its front end to a point adjacent its rear end and having formed in such rear end an opening reducing the effective area of the widened portion of the plate to a point where it is less than the effective resistance of the narrower portions of the plate, hooks supported from the plate and means at the forward end of the plate for attaching a fish line thereto, said plate being bent upon its longitudinal axis to render the under surface thereof concave.

3. A fish lure comprising a metallic blank increasing in width from its front end to a point adjacent its rear end and having formed in such rear end an opening reducing the effective area of the widened portion of the plate to a point where it is less than the effective resistance of the narrower portions of the plate, hooks supported from the plate and means at the forward end of the plate for attaching a fish line thereto, the plate being transversely slit at a point intersecting the forward end of the opening, the sections formed by the slit being pivotally connected to one another.

4. A fish lure comprising a metallic blank increasing in width from its front end to a point adjacent its rear end and having formed in such rear end an opening reducing the effective area of the widened portion of the plate to a point where it is less than the effective resistance of the narrower portions of the plate, hooks supported from the plate and means at the forward end of the plate for attaching a fish line thereto, said plate being bent upon its longitudinal axis to render the under surface thereof concave, the plate being transversely slit at a point intersecting the forward end of the opening, the sections formed by the slit being pivotally connected to one another.

5. In a fish lure, a metallic blank simulating the silhouette of a frog, the leg portions of the blank being connected intermediate their ends and means upon said connection for mounting thereon a gang hook.

6. In a fish lure, a metallic blank simulating the silhouette of a frog, the leg portions of the blank being connected intermediate their ends and means upon said connection for mounting thereon a gang hook, the space between the adjacent faces of the legs at those portions between such connection and the body being such that the effective area of the blank is reduced to a point where the resistance thereof to passage through the water in a direction at right angles to the general plane of the blank is less than the resistance of the body portion.

In testimony whereof we hereunto affix our signatures.

ALLAN D. SKELLY.
DAVID M. SKELLY.